US008381388B2

(12) United States Patent  (10) Patent No.: US 8,381,388 B2
Schumacher et al.  (45) Date of Patent: Feb. 26, 2013

(54) METHOD FOR HANDLING A STATOR BAR USING A PIT

(75) Inventors: David Robert Schumacher, Scotia, NY (US); Yu Wang, Clifton Park, NY (US); Vincenzo Sofia, Loudonville, NY (US); Alan Michael Iversen, Clifton Park, NY (US); Jeffrey Michael Breznak, Waterford, NY (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 13/311,183

(22) Filed: Dec. 5, 2011

(65) Prior Publication Data

US 2012/0074204 A1  Mar. 29, 2012

Related U.S. Application Data

(62) Division of application No. 12/814,798, filed on Jun. 14, 2010, now Pat. No. 8,069,551, which is a division of application No. 11/159,334, filed on Jun. 23, 2005, now Pat. No. 7,735,211.

(60) Provisional application No. 60/628,931, filed on Nov. 19, 2004.

(51) Int. Cl.
| H02K 15/00 | (2006.01) |
| B23P 23/00 | (2006.01) |
| B23P 25/00 | (2006.01) |
| G01R 31/28 | (2006.01) |
| B23Q 41/02 | (2006.01) |
| B21B 15/00 | (2006.01) |
| B21D 39/03 | (2006.01) |
| B65G 15/58 | (2006.01) |
| B65G 47/34 | (2006.01) |
| B65G 47/00 | (2006.01) |

(52) U.S. Cl. ............. 29/596; 29/593; 29/563; 29/564.2; 29/33 R; 198/468.6; 198/468.8

(58) Field of Classification Search ................ 414/745.8, 414/745.9, 746.1, 746.3, 758, 763, 764, 765, 414/771, 782, 783; 29/593, 564, 564.1, 564.2, 29/33 R, 563, 596; 198/468.6, 468.8
See application file for complete search history.

(56) References Cited

U.S. PATENT DOCUMENTS

| 1,740,117 | A | * | 12/1929 | Pinckney | ........................ 212/331 |
| 1,972,029 | A | * | 8/1934 | Norquist | ..................... 219/60 R |
| 3,046,424 | A | * | 7/1962 | Tudge | ............................. 310/61 |
| 3,403,240 | A | * | 9/1968 | Henderson et al. | ........... 219/632 |
| 3,827,682 | A | * | 8/1974 | Foster et al. | ...................... 269/8 |
| 4,388,039 | A | | 6/1983 | Schwarze | |
| 4,492,501 | A | * | 1/1985 | Haney | ........................ 414/22.55 |
| 4,505,359 | A | * | 3/1985 | Corley, Jr. | ..................... 414/557 |
| 4,820,101 | A | * | 4/1989 | Fenn | ................................ 414/21 |
| 4,842,473 | A | * | 6/1989 | Zbornik | ........................ 414/626 |
| 4,926,541 | A | * | 5/1990 | Hakuta et al. | .................... 29/598 |
| 5,096,369 | A | * | 3/1992 | Ouellette | .................... 414/788.7 |
| 5,641,265 | A | * | 6/1997 | Spada et al. | ................... 414/779 |
| 5,789,840 | A | * | 8/1998 | Gould et al. | ................... 310/179 |
| 5,924,545 | A | * | 7/1999 | Crorey | ............................. 198/375 |
| 6,149,376 | A | * | 11/2000 | Peting | ......................... 414/746.3 |
| 6,297,472 | B1 | * | 10/2001 | Bong et al. | ............... 219/125.12 |
| 7,032,289 | B2 | * | 4/2006 | Oliver et al. | ..................... 29/596 |
| 7,526,853 | B2 | * | 5/2009 | Schumacher et al. | ........... 29/596 |
| 7,735,211 | B2 | | 6/2010 | Schumacher et al. | |

* cited by examiner

*Primary Examiner* — David Angwin
(74) *Attorney, Agent, or Firm* — Nixon & Vanderhye P.C.

(57) ABSTRACT

A method for handling a stator bar at a braze station including: lifting the stator bar from a platform, wherein the stator bar is in a substantially horizontal orientation on the platform; turning the stator bar from the horizontal orientation to an orientation at least 45 degrees from horizontal; aligning an upper end of the bar with a brazing station and positioning a lower end of the bar in a pit; turning the bar to reverse positions of the ends of the bar, and returning the stator bar to a horizontal orientation.

19 Claims, 8 Drawing Sheets

METHOD FOR HANDLING A STATOR BAR USING A PIT

RELATED APPLICATIONS

This application is a divisional of application Ser. No. 12/814,798 filed Jun. 14, 2010, which is a divisional of application Ser. No. 11/159,334 (now U.S. Pat. No. 7,735,211), filed Jun. 23, 2005 and claims the benefit of U.S. Provisional Application Ser. No. 60/628,931, filed Nov. 19, 2004, all of which applications are incorporated in their entirety by reference herein.

BACKGROUND OF THE INVENTION

The present invention relates to large stator bars that are used in power and industrial generators, handling these bars before they are installed in a stator, and fitting header clips to the bars during assembly.

Stator bars are typically large, long and heavy, e.g., 35 feet long and hundreds of pounds (lbs.). The bars are generally straight and extend the length of a stator. When seated in a stator, the straight sections of the stator bars form a cylindrical array around a rotor. The ends of the stator bars extend axially from opposite ends of the stator. The end portion of the stator bars extend from the ends of the stator and are curved to form end turns. The ends of stator bars are connected through copper or stainless steel fittings and water-cooled connections to form continuous hydraulic winding circuits.

The ends of the bars are each connected to a hydraulic header clip. The hydraulic header clip serves as an electrical and a cooling flow connection for the armature winding bar. The hydraulic header clip is a hollow connector that includes an enclosed chamber for ingress or egress of a cooling liquid, typically deionized water. At one open end, the clip encloses the ends of the copper strands of the armature winding bar.

A braze alloy bonds the end sections of the strands to each other and to the hydraulic header clip. A hydraulic header clip fitted to the end of the stator bar is brazed to the bar. The bar is preferably held vertically during the braze operation.

To hold the bar vertically there is a need for a braze station that can accommodate a long stator bar in a vertical position. There is also a need for supports that can position a stator bar vertically in a braze station and rotate the stator bar from a horizontal position to a vertical position. In the past, stator bars have been positioned vertically while the clip is brazed. Buildings with very high roofs and brazing workstations elevated above the vertical end of a stator bar have been required for brazing vertical stator bars. These high roof buildings and elevated workstations are expensive to construct. There is long-felt need for facilities for brazing stator bars that are advantageous, e.g., less expensive to construct, then prior facilities.

BRIEF DESCRIPTION OF THE INVENTION

A stator bar facility is disclosed including: a stator bar workstation; an in-ground pit below the workstation; a stator bar elevator extending from the workstation pit, and a coupling mechanism attached to the elevator, wherein the coupling mechanism further comprises a rotational mount to receive at least one stator bar, wherein the rotational mount enables the received stator bar to be turned from a substantially horizontal position to a substantially vertical position.

In another embodiment, the stator bar brazing facility includes: an in-ground pit below the workstation; an elevated bridge spanning the in-ground pit; a stator bar braze station and coupled to the bridge; a stator bar elevator extending from the workstation pit, wherein said elevator further comprises an extendible arm, and a coupling mechanism attached to the arm of the elevator, wherein the coupling mechanism further comprises a rotational mount to receive at least one stator bar and is adapted to rotate the stator bar in a substantially vertical plane.

A method for handling a stator bar at a braze station is also disclosed, where method comprises: lifting the stator bar from a platform, wherein the stator bar is in a substantially horizontal orientation on the platform; rotating the stator bar from the horizontal orientation to a substantially vertical orientation; positioning a upper end of the bar in alignment with a brazing station and a lower end of the bar in a pit; rotating the bar to reverse positions of the ends of the bar; and returning the stator bar to a horizontal orientation.

DETAILED DESCRIPTION OF THE INVENTION

Figure 1:
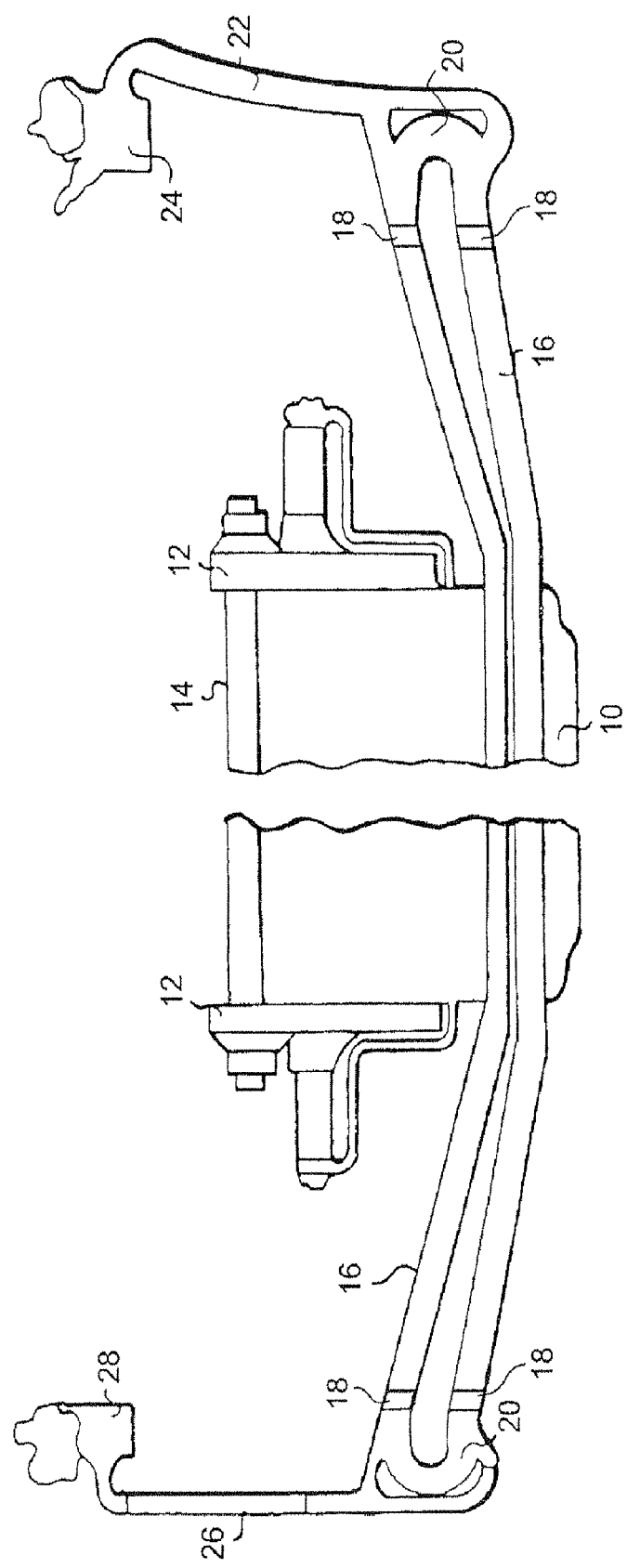
FIG. 1 is a schematic illustration of a liquid-cooled stator winding arrangement illustrating the stator, stator bars and hydraulic header clips coupled to inlet and outlet coolant headers.

FIG. 1 illustrates a liquid-cooled stator bar arrangement for a stator in a typical liquid-cooled generator. A stator core 10 has stator core flanges 12 and core ribs 14. Stator bars 16 (also referred to as armature winding bars) pass through radially extending slots in the stator core and are capped at opposite ends by hydraulic header clips 18 fitted to the ends of the bars. Inlet hoses 22 connect an inlet clip 18 to an inlet coolant header 24. Outlet hoses 26 connect an outlet clip 18 to an outlet coolant header 28. Each stator bar forms a half an armature coil. A pair of stator bars linked at their opposite ends form a complete armature coil. Copper or stainless steel fittings 20 connect adjacent ends of the stator bar pairs to form the complete armature coil.

Figure 2:
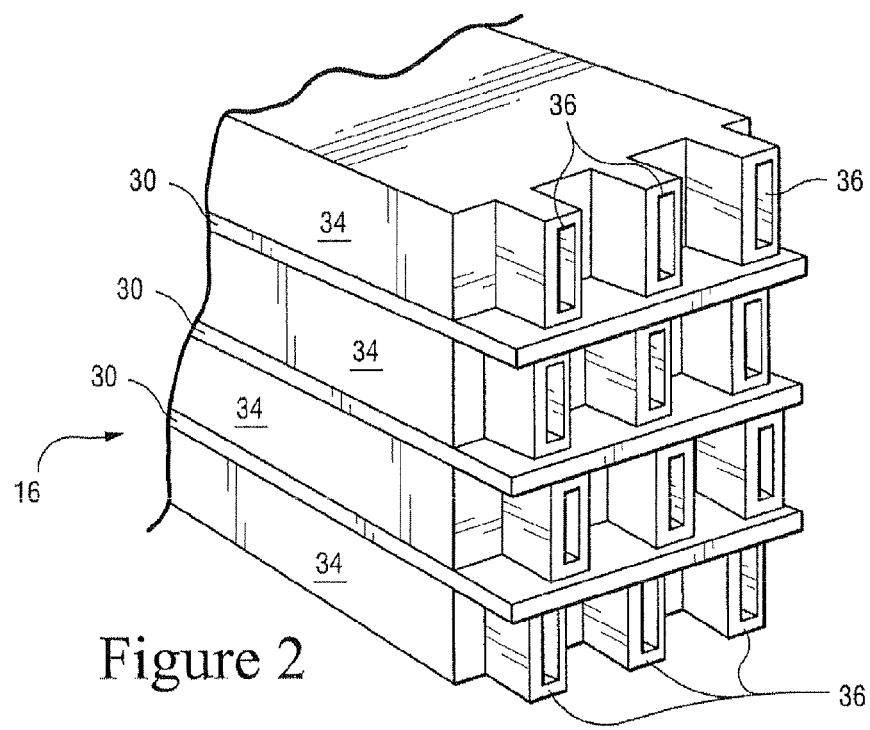
FIG. 2 is a perspective view of the end of an armature winding bar showing the tiered rows of hollow and solid strands, and interleaving sheets of braze material.
Figure 3:
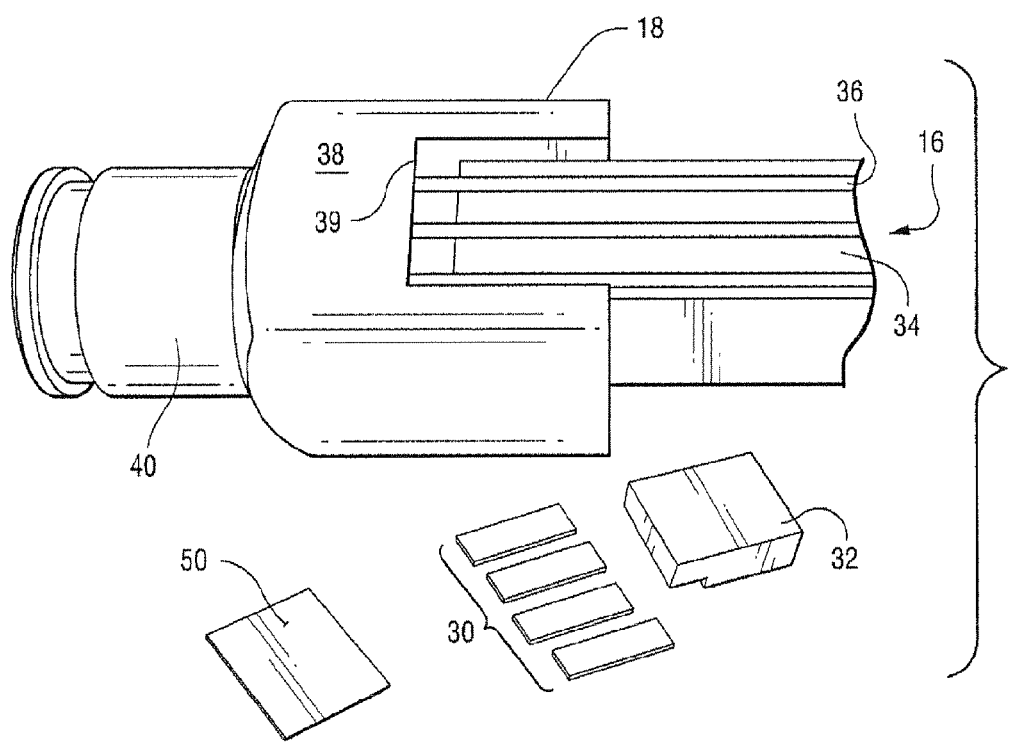
FIG. 3 is a perspective exploded view of the end of an armature winding bar inserted into a hydraulic header clip, with braze material and a clip cover shown to the side of the clip.

FIG. 2 is a perspective end view of an stator bar 16 without a hydraulic header clip. The bar is a rectangular array of solid 34 and hollow 36 copper strands. FIG. 3 is a perspective view of the end of an armature winding bar 16 inserted in a clip 18 with braze strips 30 and a braze sheet 50. A clip cover 32 is shown to the side of the clip 18. In FIG. 2, the braze strips 30 are interleaved between tiered rows of solid the copper strands 34 and rows of hollow strands 36 of the bar 16. Just prior to brazing and at the end of the stator bar, braze strips are inserted between the strands 34, 36. In addition, the braze sheets 50 and clip 32 are assembled in the clip 18.

The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16. A rectangular slot 39 in the collar receives the end of the armature winding bar and interleaved strips 30 of the braze alloy. The clip cover 32 fits into the matching rectangular slot 39 in the side of the collar 38. At the other end of the clip 18 is a cylindrical coupling end 40 that is configured to connect to the coolant circuit.

The pre-braze positioned braze alloy strips extend beyond the ends of the short solid strands. The height of the alloy pre-positioned before brazing is selected so that the braze alloy will entirely melt during the braze process and not flow into the open ends of the extended hollow strands.

During brazing, the stator bar is held in a vertical position and the end of the bar is horizontal. Melted braze alloy forms a pool over the solid strand ends of the stator bar. After brazing, the braze alloy forms a braze alloy isolation coating over the end of the armature bar (but not the end of the hollow strands). The isolation layer shields the solid strand ends and the joints from the coolant passage in the clip. The braze alloy also bonds the clip to the strands and the strand ends to each other.

Figure 4:
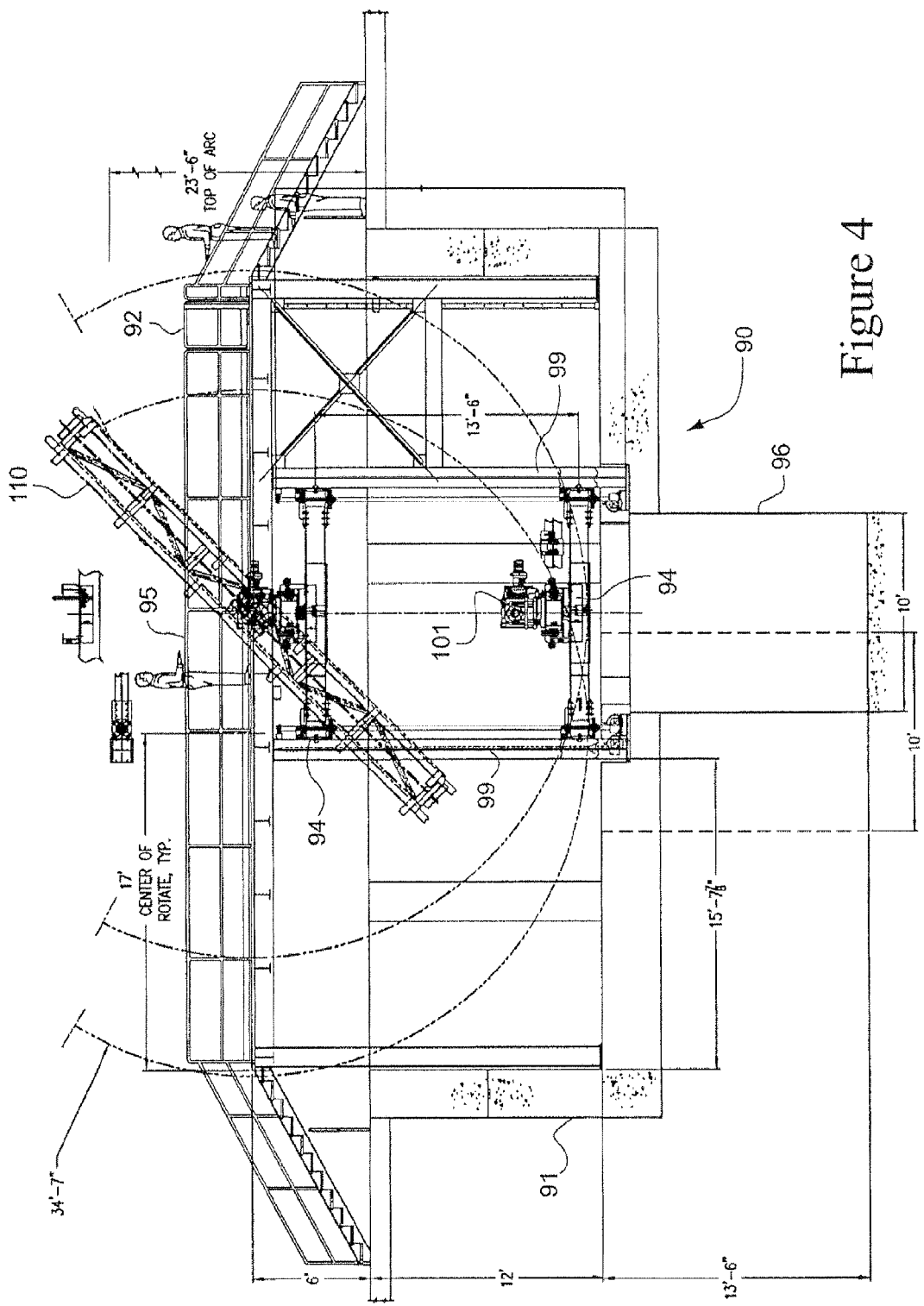
FIGS. 4, 5 and 6 are side, end and top views, respectively of a braze station for attaching end clips to winding bars. Line 4-4 in FIG. 6 indicates the view shown in FIG. 4. Line 5-5 in FIG. 6 indicates the view shown in FIG. 5.
Figure 5:
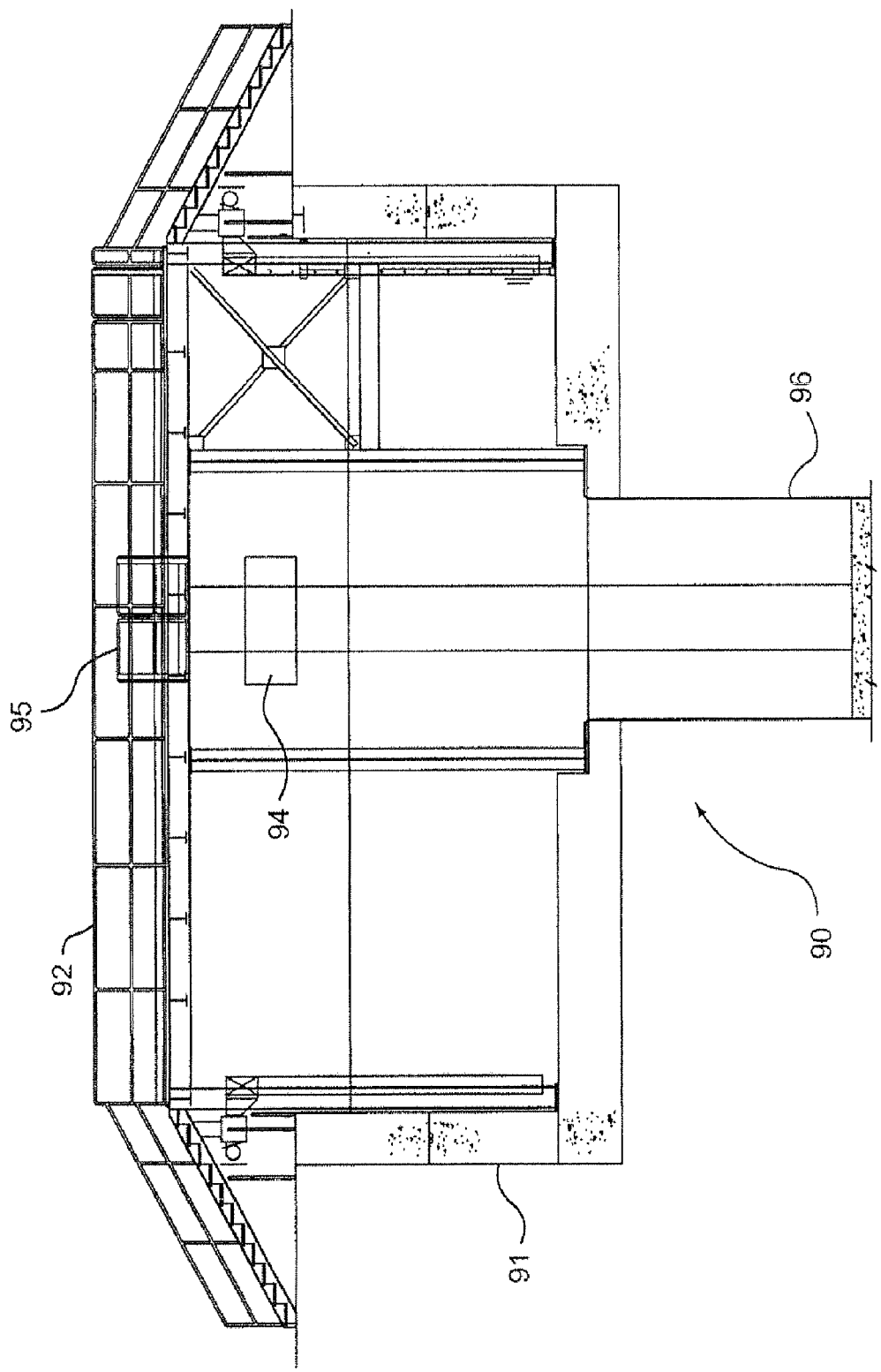
Figure 6:
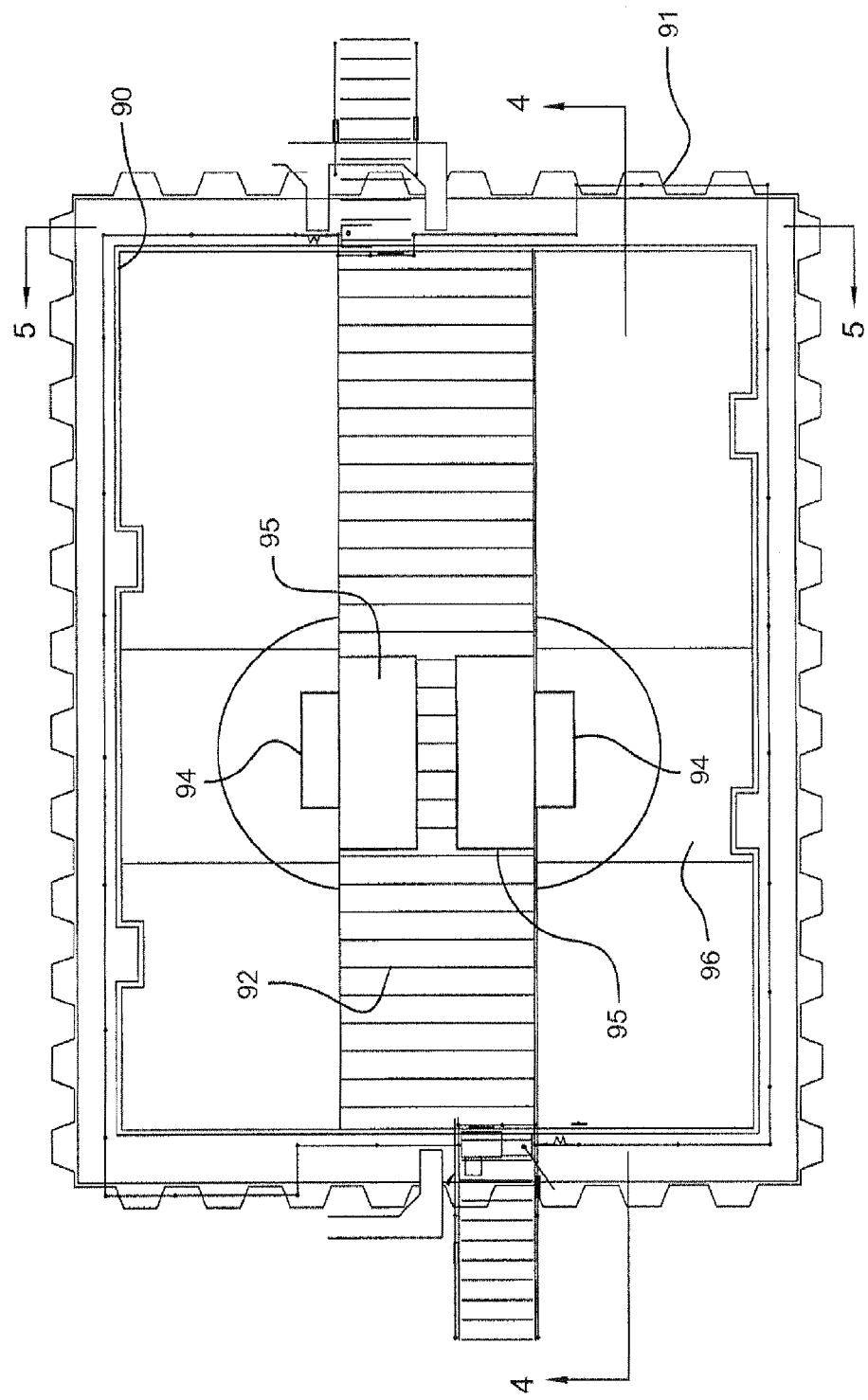

FIGS. 4, 5 and 6 are side, end and top views, respectively, of a braze station 90 for vertically brazing stator bars. The braze station 90 includes a pit 91, a bridge 92 over the pit and a stator bar elevator 94 extending form the bottom of the pit 91 to the bridge. The in-ground pit 91 provides a large volume within which to reposition stator bars, e.g., to rotate the bar in a vertical plane while the center of the bar is at the level of the bridge 92. The in-ground pit may have a depth of twelve (12) feet, a length of forty (40) feet and a width of thirty-two (32) feet (which is about the length of a stator bar). The dimensions disclosed herein are exemplary and a braze station may be designed with different dimension for a particular application of stator bars. The dimensions of the in-ground pit may be sufficient to allow a stator bar to be rotated about its center, where the bar center is at the elevation of the bridge and is generally aligned with the mid-point of the bridge length.

Within the in-ground pit 91 is a deep pit 96 that is vertically aligned generally with the braze workstation 95 and the mid-point of the bridge 92. The deep pit 96 may be cylindrical. The deep pit allows the stator bars to be lowered vertically until the upper end of the bar is level with the workstation. For example, the deep pit 96 may have a bottom that is below the bridge a distance equal to the length of a stator bar e.g., thirty-one and one-half feet, and the depth below ground level of twenty-three and one-half feet. The expense of excavation of the in-ground pit 91 and deep pit 96 is minimized by limiting the horizontal cross section of the deep pit 96 to an area sufficient to raise and lower a vertical stator bar and limiting the in-ground pit 91 to a depth sufficient to allow the stator bar to rotate about the upper limit of the distance traversed by the elevator 94.

The vertical braze station 90 may be in a factory bay with a roof that has sufficient less clearance, e.g., twenty-five feet, for handling of stator bars, such as to allow for a crane ceiling height. The bridge 92 in the station may be elevated to reduce the needed excavation depths of the pits 91, 96. The bridge 92 has workstations 95 to allow technicians to braze the ends of the stator bars which are held vertically within the pit. Associated with the bridge are brazing hoods and other equipment (not shown) needed to braze the hydraulic clips to the end of the stator bars. The stator bars are stored horizontally on storage platforms 98 on either or both sides of the pit 91. The platforms are substantially horizontal, but may be on a slight incline such as up to 10 degrees from horizontal. The bars may be mounted on cradles 110 (FIG. 13) at the platforms.

An elevator 94 in the pit and adjacent the bridge holds the stator bars while they are in the pit. Instead of an elevator, a crane or other stator bar handling mechanism may be used to move the stator bar from a platform 98 to the pit, and to rotate the bar so that it may be aligned with a workstation. The stator bars are supported by a cradle 110 that is latched to the elevator 94. One cradle may hold a pair of stator bars. The elevator 94 moves the stator bars with respect to the workstations 95 and storage platforms 98. The elevator moves the stator bars and cradle between the storage platforms 98 and the workstations, and turns the stator bars between horizontal and vertical positions. The elevator may comprise a pair of vertical rails 99 in a frame that is mounted over the deep pit 96 and sits on the floor of the shallower pit 91. An electric motor 101 drives the elevator 94 up and down the rails 99 and thereby raises and lowers the cradle 110 and stator bars. In addition, the motor 101 may rotate the cradle in a vertical plane.

Figure 7:
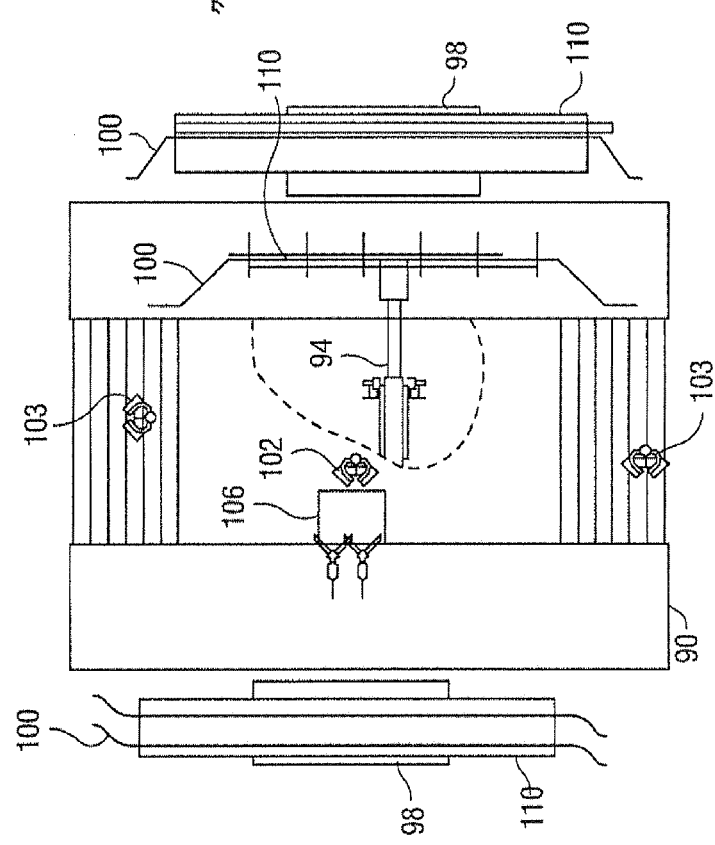
FIG. 7 is a top view of a braze station illustrating the loading of stator bars on the stator bar transport in the workstation pit.
Figure 10:
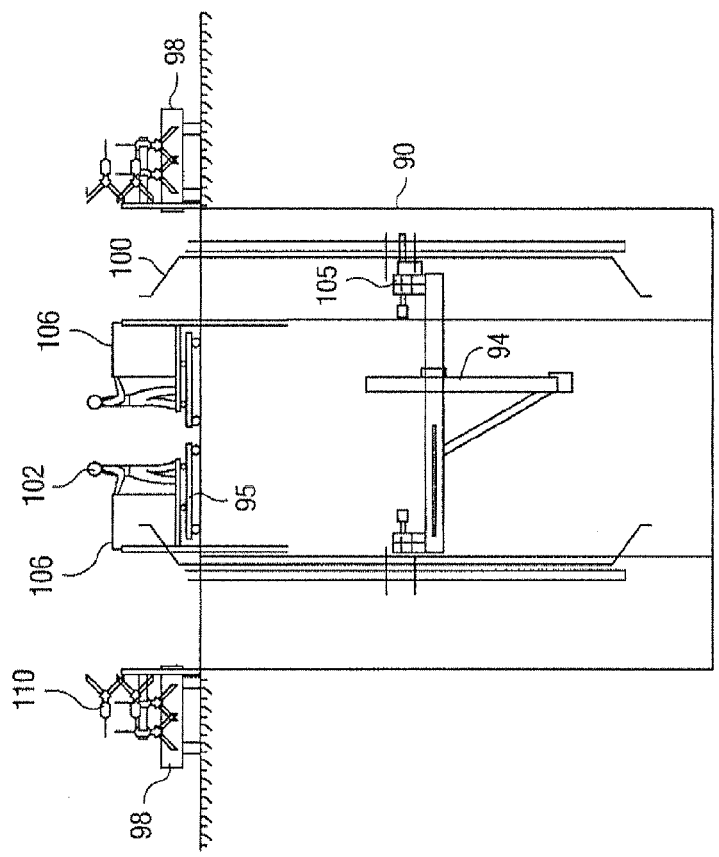
FIG. 10 is an end view of a braze station showing the stator bar turned to vertical position and being moved into position for brazing.

FIG. 7 is a schematic top view showing the loading of a stator bar 100 and cradle 110 from the loading platform 98 to the elevator 94. A dash line through the bridge shows the elevator 94 underneath the bridge. A workman 102 stands at the workstation 95 that moves up and down. As shown in FIG. 7, the workman 102 may be at the same level as are other work persons 103 on the bridge. In contrast, FIG. 10 shows that the workstation 95 may move vertically to better position the workman and the braze hood 106 with respect to the end of the stator bar.

Figure 8:
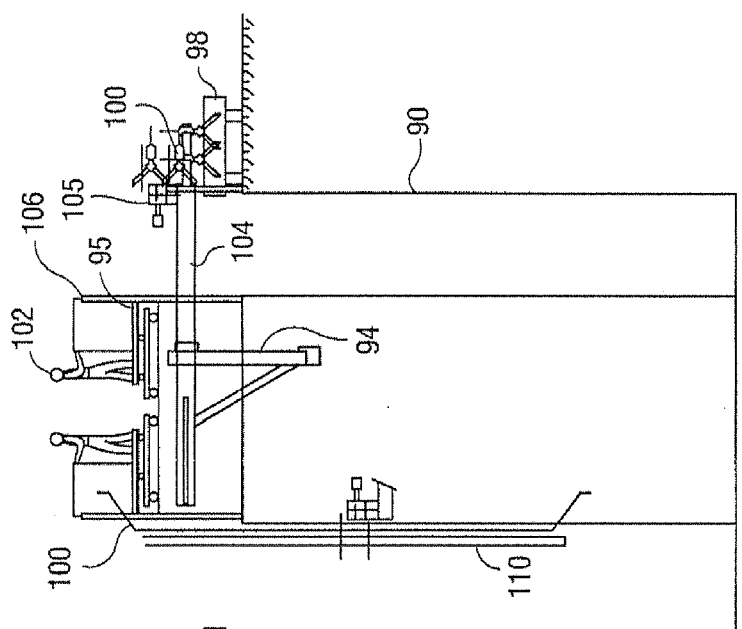
FIG. 8 is a side view of the braze station showing the stator bar transport extended to receive a stator bar from a loading station.

As shown in FIG. 8, the elevator 94 extends its arm 104, e.g., telescoping arm, outward to grasp a cradle 110 with one or more stator bars from the loading platform 98. The arm has on a distal end a coupling and latching mechanism 105, which may be a pair of fingers that grasp a connection on a cradle holding the stator bars. The latching mechanism further comprises a rotational attachment that enables the stator bar and its cradle to be rotated in a vertical plane about the distal end of the elevator arm 104.

The stator bars 100 are in a horizontal position as they are moved from the storage platform 98 to the pit 91. The elevator 94 raises the cradle and its stator bars and turns the cradle and bars to a vertical orientation. Raising the stator bars allows the cradle and stator bars to be lifted off the platform. The vertical stator bars are lowered so that their upper ends are within reach of the workstation 95. The workstation 95 may be raised or lowered and moved to the left or right (parallel to the bridge) to be properly positioned with respect to the stator bar ends. In addition, the elevator arm 104 may retract or extend the bars 100 (in a direction perpendicular to the bridge) to assist in positioning the bars with respect to the workstation. The braze station may provide six degrees of motion to position the ends of the stator bars in the braze hood. The six degrees are: up-down of bars and workstation, forward-back of bars, left-right of workstation.

Figure 9:
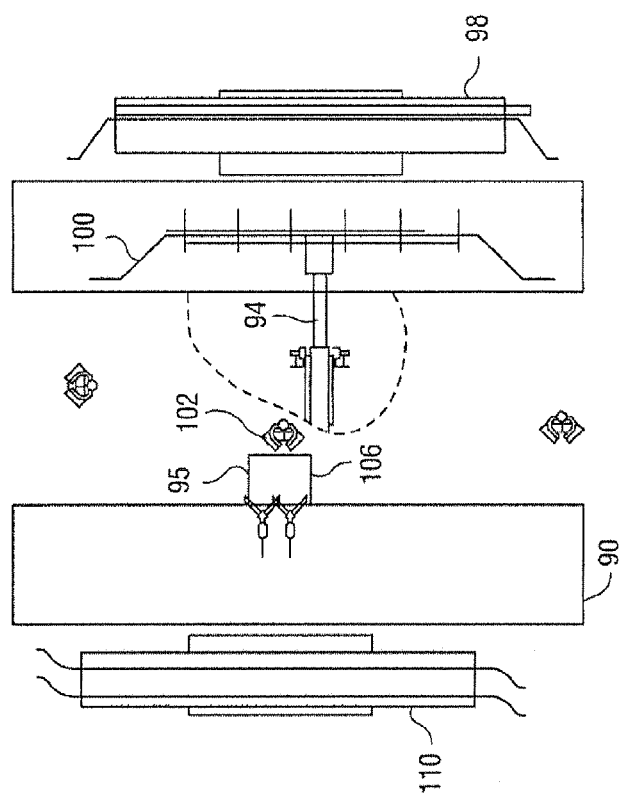
FIG. 9 is a top view of the braze station showing the transport moving the stator bar over the pit.

The workstation may include a braze housing 106 that is used to heat and braze the end of the stator bar to the clip. At the workstation 95, the upper ends of the stator bars are mounted in the brazing hood 106 where the clip is brazed to the stator bar. The workstation 95 may be raised or lowered (compare FIGS. 8 and 10) to orient the workstation to the best position with respect to the end of the stator bar. Once the clips have been brazed to the stator bars, the elevator arm 104 extents the stator bars and rotates them 180° (see circular arcs in FIG. 4) to bring the opposite ends of the stator bars up to the workstation 95, as is shown in FIGS. 9 and 10. When both ends of the stator bars have been brazed with hydraulic clips, the elevator 94 turns the stator bars to a horizontal position and the arm 104 extends to move the stator bars and cradle back to the loading platform 98.

Figure 11:
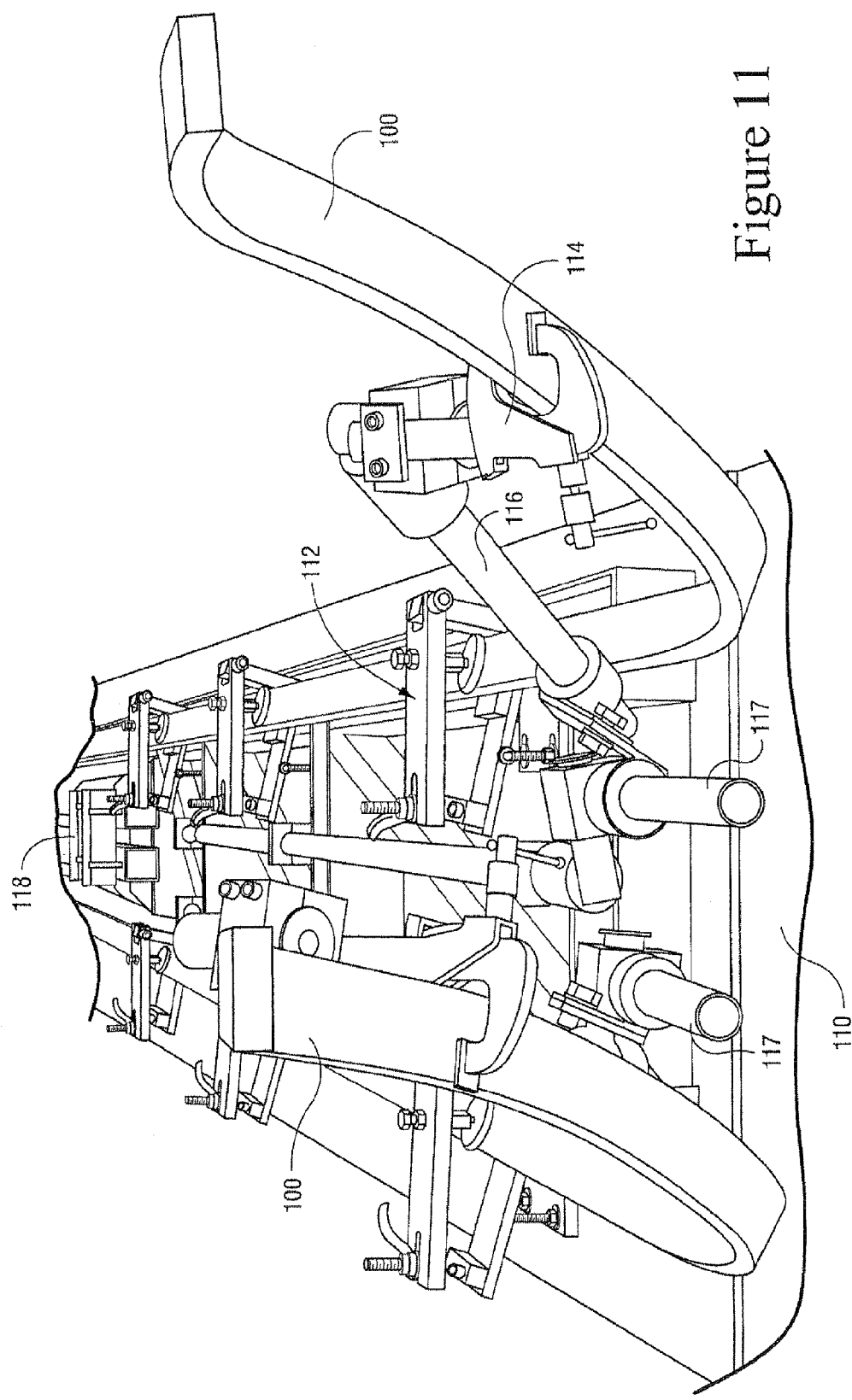
FIG. 11 is an end perspective view of a cradle for holding stator bars in the braze station.

FIG. 11 is a perspective end view of a stator bar cradle 110 and with two stator bars 100 mounted thereon. The cradle 110 is a rectangular frame having longitudinal beams and crossbeams that provide a rigid support for the stator bars. The stator bars may be loaded on the cradle at the platform 98 adjacent the braze station 90.

A stator bar holding cradle 110 secures a stator bar as the hydraulic header end clips are attached to the bar. The cradle is a protective device to avoid direct handling of the bars and avoid damage to the bars. In addition, the cradle serves as an interface to the elevator 94 to ensure an engagement for multi-positional handling by the elevator. The stator bar holding cradle 110 provides multi-positional handling of the stator bar. The cradle has at least three and preferably six degrees of freedom restraints on the bar for vertical position operation.

The restraint system for the cradle 110 comprises angle adjustable two side-clamping grippers 112 arranged in an array along the length of the cradle. There may be for example six stator bar grippers 112 spaced evenly along the length of the cradle to grasp the straight section of a stator bar. These grippers are arranged lengthwise along the stator bar sled and are pivotably attached to the sled. The pivoting movement allows the grippers to adjust for slight bowing and other variations in the stator bar. The clamp grippers 112 grasp the straight section of a stator bar 100. At each end turn section of the bar are two adjustable arms with end-turn clamp grippers 114 to grasp the end turns. The end adjustable grippers 114 have hydraulic expandable arms 116 that are adjusted to fit different bar arm lengths. The cradle 110 has a 90-degree (perpendicular) dual pin coupling system 118 to securely engage with a cradle connector, e.g., a pair of fingers, on the elevator 94.

The dual pin handling engagement and locking mechanism 188 may be at the center of the cradle. The dual pin mechanism may be a bracket of a pair of rectangular tubes that receive fingers from the elevator. The fingers engage the rectangular tubes and are locked to the tubes so that the cradle is securely attached to the elevator 94.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for handling a stator bar at a braze station comprising:
    lifting the stator bar from a platform;
    moving the lifted stator bar to over a pit;
    while the stator bar is over the pit, turning the stator bar to an orientation at least 45 degrees from horizontal;
    aligning a first end of the bar with a brazing station while a second end of the bar is in the pit;
    after aligning the first end with the brazing station, turning the bar to align the second end with the brazing station while the first end is in the pit, and
    after aligning the second end with the brazing station, returning the stator bar to a horizontal orientation and moving the stator bar away from the pit.

2. The method of claim 1 further comprising lowering the stator bar after the step of turning the stator bar.

3. The method of claim 1 further comprising grasping a middle section of the bar with a mechanical arm and the turning step includes rotating the arm while grasping the bar.

4. The method of claim 1 further comprising lowering the stator bar into the pit, such that at least one-half of a length of the stator bar is within the pit.

5. The method of claim 1 wherein the brazing station is movable in a directional parallel to a rotational plane of the turning stator bar, and the step of aligning the first end with the brazing station includes moving the brazing station parallel to the rotational plane.

6. The method of claim 1 further comprising moving the stator vertically using an elevator, and moving the stator bar horizontally using a mechanical arm connected to the elevator.

7. The method of claim 1 wherein the orientation is a vertical orientation of the stator bar and the method includes holding the stator bar in the vertical orientation while the first end or the second end is brazed in the brazing station.

8. The method of claim 1 wherein the brazing station is over the pit and the step of aligning the first end includes moving the brazing station horizontally.

9. The method of claim 1 wherein the lifting step is performed using an elevator supporting a releasable coupling which grasps the stator bar when on the platform, and the step of aligning the first end includes the elevator lowers the stator bar.

10. A method for handling a stator bar at a stator bar facility having a stator bar workstation, an in-ground pit proximate to and at an elevation below the workstation, and a stator bar transport proximate to the in-ground pit, wherein the method comprises:
    loading the stator bar onto the stator bar transport, wherein the stator bar transport includes a rotational mount to receive the stator bar;
    rotating the rotational mount to turn the stator bar at least 45 degrees in a vertical plane to lower a first end of the stator bar into the in-ground pit;
    positioning at least a third of a length of a stator bar down into the in-ground pit;
    aligning a second end of the bar with the workstation, and turning the bar to reverse positions of the ends of the bar, such that the second end of the bar is aligned with the workstation and the first end is lowered into the in-ground pit.

11. The method of claim 10 further comprising lowering the stator bar in conjunction with turning the stator bar.

12. The method of claim 10 wherein the stator bar transport includes a coupling to releasably grasp the stator bar and the loading step includes grasping a middle portion of the stator with the coupling.

13. The method of claim 10 wherein the transport mechanism includes a stator bar elevator and the method further comprising moving the stator bar vertically by the elevator.

14. The method of claim 10 wherein the rotationally step includes turning the stator bar from a substantially horizontal orientation to a substantially vertical orientation.

15. The method of claim 10 wherein the workstation is elevated above ground level and at least one-half of a length of the stator bar is within the pit when the stator bar is turned to a vertical position.

16. The method of claim 10 wherein the workstation is on a bridge over the in-ground pit and the transport and the turning of the stator bar aligns the first or second end of the stator bar with the workstation on the bridge.

17. The method of claim 10 wherein the workstation is a brazing station and the method further comprises brazing at least one of the first end and the second end.

18. A method for handling a stator bar at a workstation above a pit proximate to a stator bar transport device, the method comprises:
   releasably coupling the stator bar to the stator bar transport device;
   turning and moving the stator bar with the stator bar transport device such that at least a third of the stator bar extends down into the in-ground pit;
   aligning a first end of the bar with the workstation while the stator bar extends into the in-ground pit;
   after aligning a first end of the bar with the work station, turning the stator bar with the stator bar transport device such that the entire bar is above the in-ground pit and thereafter moving the bar away from the pit, and
   decoupling the stator bar from the stator bar transport.

19. The method of claim 18 further comprising brazing the first end of the bar while the first end is aligned with the workstation.

* * * * *